March 22, 1966  S. D. STOOKEY  3,241,935
BONE CHINA AND METHOD OF MAKING IT
Filed July 29, 1963  2 Sheets-Sheet 1

INVENTOR.
Stanley D. Stookey
BY Clarence R. Patty, Jr.
ATTORNEY

March 22, 1966      S. D. STOOKEY      3,241,935

BONE CHINA AND METHOD OF MAKING IT

Filed July 29, 1963      2 Sheets-Sheet 2

INVENTOR.
Stanley D. Stookey

BY *Clarence R. Patty Jr.*

ATTORNEY

United States Patent Office 3,241,935
Patented Mar. 22, 1966

3,241,935
BONE CHINA AND METHOD OF MAKING IT
Stanley D. Stookey, Corning, N.Y., assignor to Corning Glass Works, Corning, N.Y., a corporation of New York
Filed July 29, 1963, Ser. No. 298,012
3 Claims. (Cl. 65—33)

This application is a continuation-in-part of my copending application Ser. No. 766,180 filed Oct. 9, 1958, now abandoned.

This invention relates to the production of semicrystalline ceramics by the controlled crystallization of glass by heat treatment and it relates particularly to a novel method of producing semicrystalline articles having compositions and properties similar to those of bone china.

Tableware known as bone china originated and has its chief source in England. It is difficult and expensive to make but is highly regarded on account of its whiteness and high translucency, which are the characteristic features of this ware.

The manufacture of bone china is extremely difficult as compared with other white ware such as porcelain. The workability of a typical batch for bone china is relatively low since it comprises nearly 50% of bone ash, which is a non-plastic material, and also contains china clay and Cornish stone, the latter of which is a natural mixture of flint, feldspar and some clay and is also non-plastic. The ware shrinks tremendously during firing and is very sensitive to overfiring. If the temperature rises slightly above the maturing point, it causes the ware to form bubbles and cavities and to assume a spongy appearance. Another defect which causes loss to the manufacturer is its tendency to go off-color.

It is an object of this invention to provide an improved method for making bone china whereby such difficulties are overcome and the same or comparable ware is produced in a greatly increased volume in a shorter time and at less expense.

Figure 1:
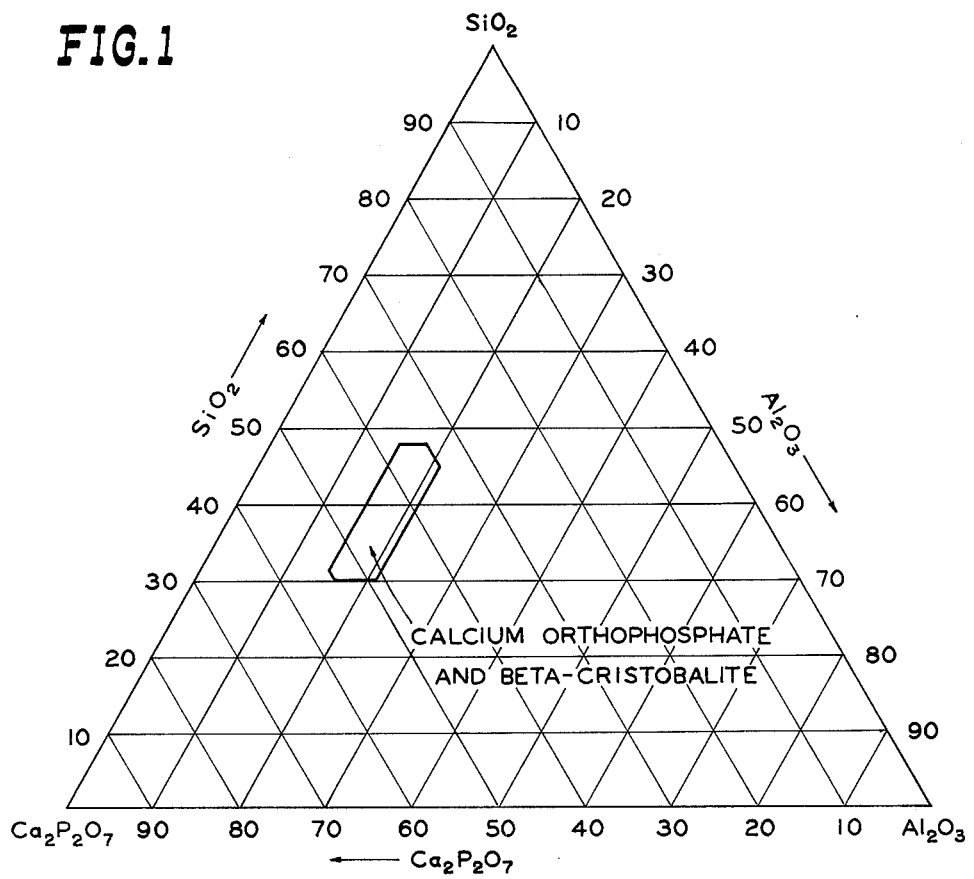
Figure 2:
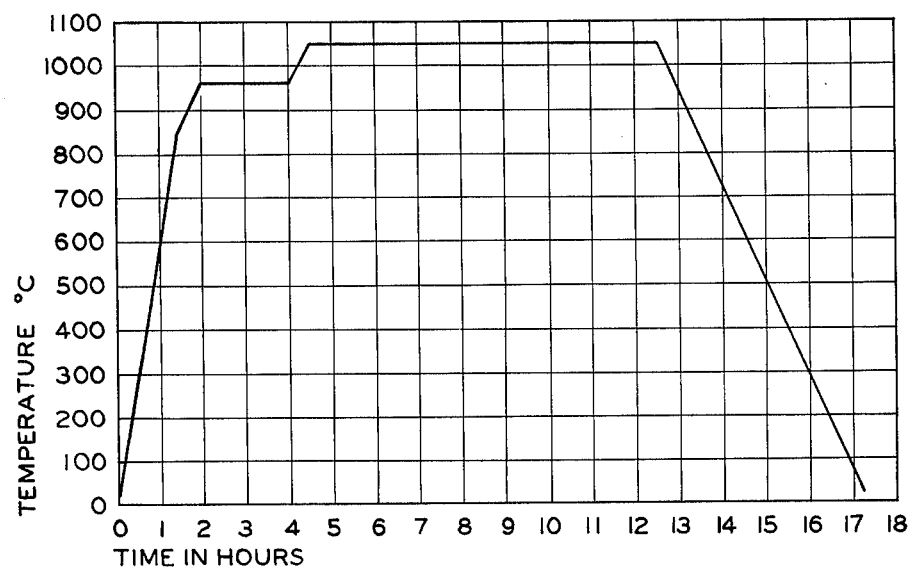

Other objects of this invention will become apparent from the following description and the accompanying drawings wherein:

FIGURE 1 is a phase diagram setting forth the crystalline phases present in the product of this invention; and FIGURE 2 sets forth a time-temperature curve for a specific embodiment of the method of producing the product of this invention.

The invention is predicated on my discovery that a very narrow and critical range of compositions, differing slightly but critically from those of ordinary bone china, can be melted in the conventional manner in pots, crucibles or tanks to form glasses which may be fabricated by the usual procedures into a variety of shapes and that such clear glass articles can be converted by subsequent specific heat-treatments into semicrystalline bodies having properties and characteristics similar to those of bone china.

More specifically, the invention comprises providing a composition, consisting essentially of $SiO_2$, $Ca_2P_2O_7$ and $Al_2O_3$ in the relative proportions of 30–48% $SiO_2$, 34–54% $Ca_2P_2O_7$ and 15–21% $Al_2O_3$ by weight, the weight ratio of $Ca_2P_2O_7/Al_2O_3$ being not less than 1.85, melting it to a homogeneous glass, shaping the glass to form an article, raising the temperature of the article between 850° C. and 1050° C. at a rate not exceeding about 5° C. per minute and holding it at about 1050° C. until its linear thermal expansion coefficient has increased to more than $90 \times 10^{-7}$ per ° C. between 0° and 300° C. This heat treatment converts the glass article into a semicrystalline ceramic body, i.e., a body composed of fine-grained crystals of relatively uniform size dispersed substantially completely through a glassy matrix, the crystals comprising the major portion of the mass of the body. As the crystallization of the glass article occurs in situ, a practically homogeneous body of fine-grained crystals can be produced which is substantially free of voids and is non-porous.

The thermal expansion coefficients of the present compositions in the vitreous state range from about $50 \times 10^{-7}$ to about $70 \times 10^{-7}$ per ° C. between 0° C. and 300° C. When converted to a semicrystalline state, their expansion coefficients are thereby increased and the amount of such increase is a rough indication of the extent or completeness of crystallization. Each composition possesses a latent or potential crystallizability and adequate crystallization is brought about when the heat treatment is sufficiently prolonged to increase the expansion coefficient to at least $90 \times 10^{-7}$ and preferably above $100 \times 10^{-7}$ per ° C. between 0° C. and 300° C. In a similar manner, though less markedly, the extent of crystallization also is indicated by an increase in the specific gravity of the composition.

The heat treatment may also, and advantageously does, include holding the article between 950° C. and 1000° C. for a time ranging from at least 2 hours at 950° C. to at least ½ hour at 1000° C. before raising it to said final holding temperature of about 1050° C. Holding at such intermediate temperature causes the crystallization of the body to proceed at the lower temperature to an extent sufficient to raise its deformation temperature or to provide it with a rigid crystalline structure and ensure that the body will not become deformed by a softening of the glassy matrix when it is further heated at the maximum temperature. Omission of such intermediate heat treatment, however, and progressive heating of the body to 1050° C. as described produces satisfactory results provided that the rate of increase of the temperature does not exceed about 5° C. per minute. So as to conserve heat, such heat treatments may be carried out immediately after the shaped glass article is formed and while it is still hot (preferably 850° C. or less) but, if desired, it may be cooled to room temperature and subsequently reheated.

It is characteristic of these compositions that they do not possess any of the so-called nucleating agents and require only reheating to bring about maximum crystallization. It is believed that the present glasses are composed of two liquid phases which are miscible at melting temperature but which segregate at lower temperatures, a phosphate-containing phase forming substantially invisible minute droplets which are dispersed throughout the residual glass. Such droplets finally solidify and become extremely small crystalline nuclei on which the crystals characteristic of bone china form and grow when the glass is cooled and subsequently reheated as described.

In the preparation of the above-defined composition, the usual batch materials may be used including bone ash, feldspar, clay or other materials containing the essential constituents. Purified materials such as sand, or lime and phosphoric salts, or alumina may also be utilized if it is desired to avoid objectionable impurities such as those which cause discoloration of the ware, for instance, oxides of iron.

Bone ash is ordinarily produced by the calcination of bones. The composition of the bone ash, which was utilized in the batches disclosed herein, corresponds to about 96.3% of calcium pyrophosphate, $Ca_2P_2O_7$, and contains about 1.5% CaO in excess of the theoretical amount, together with minor amounts of MgO, $SiO_2$, $Al_2O_3$, and alkali metal oxides.

Such small amounts of extraneous materials, however, do not appreciably affect the fundamental characteristics of the final product of the invention. For convenience, therefore, the present compositions are considered as ternary compositions consisting essentially of $SiO_2$, $Ca_2P_2O_7$ and $Al_2O_3$. The compositions may also be considered as quaternary compositions consisting essentially of $SiO_2$, CaO, $P_2O_5$ and $Al_2O_3$ which, however, are more difficult to picture graphically.

Optional compatible oxides or materials, which do not materially affect the fundamental characteristics of the product, may be present provided that the total amount of such nonessential materials does not exceed about 5%, for example, up to 5% $CaF_2$, up to 2% of one or more of the alkali metal oxides $K_2O$, $Na_2O$ and $Li_2O$, up to 3% $ZrO_2$, up to 5% MgO and/or ZnO and/or BaO and/or PbO. The composition should preferably not contain individually more than 4% CaO or 2% $P_2O_5$ in excess of that in the $Ca_2P_2O_7$.

The following batches in parts by weight illustrate the compositions of this invention:

TABLE I

|  | 1 | 2 | 3 | 4 | 5 | 6 | 7 | 8 |
|---|---|---|---|---|---|---|---|---|
| Sand | 180 | 360 | 433 | 240 | 480 | 480 | 505 | 225 |
| Bone Ash | 300 | 625 | 541 | 240 | 492 | 518 | 493 | 185 |
| Alumina | 120 | 216 | 228 | 120 | 228 | 204 | 204 | 90 |

To obtain homogeneous glasses, the batches should be melted at least at about 1550° C. for about 16 hours. They may be melted in pots, crucibles or tanks depending upon the size of the melt. The resulting glasses are sufficiently fluid at the melting temperature to fine readily without the use of fining agents, particularly in pot or crucible melts. A fining agent such as 0.1–1% $As_2O_5$, however, may be added if necessary. The use of reducing agents is undesirable because strong reducing conditions tend to reduce the phosphate objectionably. Oxidizing agents such as $As_2O_5$, $Ca(NO_3)_2$ or $Al(NO_3)_3$ may be used, if desired, to neutralize unintentional reducing conditions but otherwise are not essential.

When the above batches are melted, the resulting corresponding glasses, calculated in weight percent on the oxide basis are as follows:

TABLE II

|  | 1 | 2 | 3 | 4 | 5 | 6 | 7 | 8 |
|---|---|---|---|---|---|---|---|---|
| $SiO_2$ | 30.0 | 30.1 | 36.1 | 40.0 | 40.0 | 40.0 | 42.0 | 45.5 |
| $Ca_2P_2O_7$ | 48.2 | 50.1 | 43.3 | 38.6 | 39.6 | 41.6 | 39.6 | 35.0 |
| $Al_2O_3$ | 20.0 | 18.0 | 19.0 | 20.0 | 19.0 | 17.0 | 17.0 | 18.3 |
| CaO | 0.9 | 0.9 | 0.8 | 0.7 | 0.7 | 0.7 | 0.7 | 0.6 |
| MgO | 0.9 | 0.9 | 0.8 | 0.7 | 0.7 | 0.7 | 0.7 | 0.6 |

The following flow sheet is included as an aid in explaining the various procedural steps of the invention.

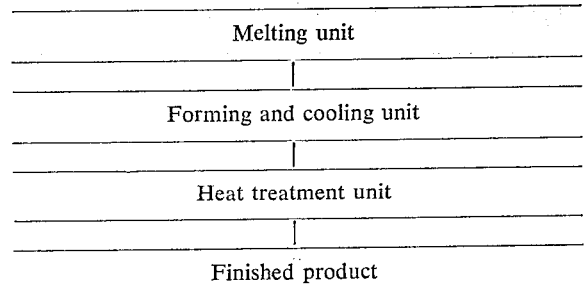

Thus, the batch is first melted in a suitable melting unit, the melt advantageously being stirred to insure glass homogeneity. The molten glass is then formed into the desired shapes by conventional glassworking methods such as casting, drawing, pressing, rolling, and the like, cooled to at least below 850° C., and, preferably, annealed in a lehr and cooled to room temperature. This cooling to room temperature allows the glass article to be inspected visually. The formed glass body is finally heated to the desired temperature in the heat treatment unit wherein it is converted to the semicrystalline ceramic product.

This invention, then, provides a thermally crystallizable glass, i.e., a glass whose principal utility lies in its conversion through heat treatment to a semicrystalline ceramic body. Nevertheless, the glass may be useful in itself, e.g., in the production of containers and the like.

In the above examples, the batches were compounded, ball-milled for several hours to aid in obtaining a homogeneous melt, and then melted in open platinum crucibles equipped with stirrers for 16 hours at 1550° C. The melts were poured into steel molds and cooled as a glass to room temperature. These glass shapes were placed in a furnace, heated at about 10° C./minute to 850° C., and then heated in accordance with the preferred two-step heat treatment of the invention at the rates indicated in Table III to the temperature of the first level of heat treatment. The bodies were held thereat for 2 hours, the temperature then raised to the second level of heat treatment at the same heating rates, the articles held thereat for the times stated in Table III, and thereafter the heat to the furnace was cut off and the semicrystalline bodies were cooled to room temperature retained therein (about 2° C./minute). The rate of heating the glass bodies depends upon the structure of the glass article, very thin glass articles being able to withstand much more rapid heating without breaking than thick articles. The rate of heating to 850° C. has no real effect upon the crystallization of the glass within the temperature range 850°–1050° C. The speed of cooling to room temperature is governed by the resistance to thermal shock possessed by the body. The moderate thermal expansion of the product of this invention permits quite rapid temperature changes and some shapes have been removed from the furnace directly after the heat treatment has been completed and cooled in air to room temperature.

In Table III are shown the expansion coefficients per ° C. between 0° and 300° C. in whole units (Expn.×10⁷) and specific gravities (sp. gr.) of the glasses of Table II together with the expansion coefficients, specific gravities and the mechanical strength (p.s.i.) of their corresponding semicrystalline products and the respective heat treatments used in converting the glasses thereto. The semicrystalline product of each composition shows by X-ray analysis the presence of crystals of calcium orthophosphate, $Ca_3(PO_4)_2$, and beta-cristobalite. Such products are white and translucent in a thickness of 3 mm. or less.

The mechanical strengths (p.s.i.) shown in Table III were measured by supporting individual canes or rods cut from the product, about ¼ inch in diameter and 4 inches long, on 2 knife edges spaced 3½ inches apart and loading them on two downwardly acting knife edges about ¾ inch apart centrally spaced from the lower knife edges. To ensure comparable results, the rods were first abraded by being rolled in a ball mill for 15 minutes with 30 grit silicon carbide. The corresponding abraded glass rods treated and measured in this manner show mechanical strengths ranging from 5,000 to 6,000 p.s.i.

TABLE III

| No. | Glass | | Heat treatment | | | | | Ceramic | | |
|---|---|---|---|---|---|---|---|---|---|---|
| | Expn. ×10⁷ | Sp. Gr. | Heating rate | Hr. | ° C. | Hr. | ° C. | Expn. ×10⁷ | Sp. Gr. | P.s.i. |
| 1 | 69 | 2,631 | 3° C./min | 2 | 960 | 4 | 1,050 | 108 | 2,647 | |
| 2 | 68 | 2,639 | 3° C./min | 2 | 960 | 8 | 1,050 | 128 | 2,657 | 16,870 |
| 3 | 61 | 2,599 | 3° C./min | 2 | 960 | 8 | 1,050 | 117 | 2,609 | 17,020 |
| 4 | 54 | 2,561 | 3° C./min | 2 | 960 | 8 | 1,050 | 108 | 2,578 | 14,800 |
| 5 | 55 | 2,560 | 3° C./min | 2 | 960 | 8 | 1,050 | 117 | 2,572 | |
| 6 | 57 | 2,556 | 3° C./min | 2 | 960 | 8 | 1,050 | 129 | 2,583 | 10,730 |
| 7 | 53 | 2,550 | 3° C./min | 2 | 960 | 8 | 1,050 | 130 | 2,571 | 8,060 |
| 8 | 52 | 2,527 | 5° C./min | 2 | 960 | 8 | 1,050 | 122 | 2,537 | |

The above recited ranges of the essential constituents, $SiO_2$, $Ca_2P_2O_7$ and $Al_2O_3$, are critical for the purpose of this invention for the following reasons: Difficulty in melting and shaping the glass results from a deficiency of $Al_2O_3$ or an excess of $Ca_2P_2O_7$ over the stated limits; compositions containing less than 16% $Al_2O_3$ require melting temperatures up to about 1650° C. but compositions containing less than about 15% $Al_2O_3$ require temperatures so high as to be impractical with present refractories and heating means. An excess of $SiO_2$ or $Al_2O_3$ or a deficiency of $Ca_2P_2O_7$, on the other hand, produces glasses which do not crystallize enough to form the desired body but instead merely become opacified like the so-called opal glasses when subjected to the above described heat treatment. A deficiency of $SiO_2$ produces very fluid glasses which crystallize spontaneously on being cooled and hence cannot be worked or shaped by conventional glassworking techniques.

The product sought in this invention is a fine-grained, semi-crystalline ceramic body obtained by the controlled crystallization of a glass body in situ. The crystal content of the product has been determined to be at least 50% by weight and is preferred to be substantially completely crystalline. This feature is dependent upon the extent to which the constituents of the batch are adaptable to the formation of crystal phases. The crystals, themselves, are advantageously all finer than about 30 microns in diameter. These physical characteristics are attainable utilizing the compositions and heat treatments of this invention. Thus, heat treatments at temperatures less than about 850° C. or higher than about 1050° C. will not yield a body possessing the desired amount and size of crystallinity.

FIGURE 1 represents a phase diagram designating the crystalline phases present in the semicrystalline ceramic article resulting from the heat treatment of the glasses of the invention.

FIGURE 2 depicts a time-temperature curve for the heat treatment of a specific example of the invention, viz., Example II recorded in Table III, wherein after a glass body had been obtained by melting the required batch components and the melt had been shaped and cooled to room temperature, it was given the following heat treatment: The temperature was raised at 10° C./minute to 850° C., the heating rate was then reduced to 3° C./minute, the temperature raised to 960° C., and the body was maintained thereat for 2 hours; thereafter the temperature was raised at 3° C./minute to 1050° C., held thereat for 8 hours, and then the heat to the furnace was cut off and the furnace allowed to cool to room temperature with the body retained therein. This cooling rate averaged about 2° C./minute.

What is claimed is:

1. The method of making a semicrystalline ceramic having the properties of bone china which comprises melting a composition, consisting essentially of $SiO_2$, $Ca_2P_2O_7$ and $Al_2O_3$ in the relative proportions of 30–48% $SiO_2$, 34–54% $Ca_2P_2O_7$ and 15–21% $Al_2O_3$ by weight, the weight-ratio $Ca_2P_2O_7/Al_2O_3$ being not less than 1.85, to a homogeneous glass, shaping the glass to form an article, cooling the shaped article to a temperature at least as low as about 850° C., raising the temperature of the article between 850° C. and 1050° C. at a rate not exceeding about 5° C. per minute and holding it at about 1050° C. until its linear thermal expansion coefficient has increased to more than $90 \times 10^{-7}$ per ° C. between 0° and 300° C.

2. The method of making a semicrystalline ceramic having the properties of bone china which comprises melting a composition to a homogeneous glass consisting essentially in weight percent on the oxide basis of 30–48% $SiO_2$, 34–54% $Ca_2P_2O_7$, and 15–21% $Al_2O_3$, the weight ratio $Ca_2P_2O_7/Al_2O_3$ being not less than 1.85, shaping the glass to form an article, cooling the shaped article to a temperature at least as low as about 850° C., raising the temperature of the article between 850° C. and a first holding temperature of between 950° C. and 1000° C. at a rate not exceeding about 5° C. per minute, maintaining the article at said first holding temperature for a time ranging from at least 2 hours at 950° C. to at least ½ hour at 1000° C., heating the article from said first holding temperature to a final holding temperature of about 1050° C. at a rate not exceeding about 5° C. per minute, and holding it at about 1050° C. until its linear thermal expansion coefficient has increased to more than $90 \times 10^{-7}$ per ° C. between 0° and 300° C.

3. A semicrystalline ceramic body made in accordance with the method of claim 1.

References Cited by the Examiner
UNITED STATES PATENTS 2,359,784  10/1944  Pincus _____ 106—52
2,532,386  12/1950  Armistead _____ 106—52

OTHER REFERENCES

Levin, McMurdie and Hall, Phase Diagrams for Ceramists (Americ. Cer. Soc. Inc., Columbus, Ohio, 1956) pp. 206, 209.

Searle: Encyclopedia of the Ceramic Industries, vol. 1 (Publ. Benn Ltd., London, 1929) pp. 110–115.

DONALL H. SYLVESTER, *Primary Examiner.*